(12) United States Patent
Utz et al.

(10) Patent No.: US 8,009,957 B2
(45) Date of Patent: *Aug. 30, 2011

(54) SPIRAL OR S-CURVE STRAIN RELIEF FOR PULLING A FIBER OPTIC CABLE

(75) Inventors: Quentin Wayne Utz, Alpharetta, GA (US); Hongbo Zhang, Duluth, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/394,803

(22) Filed: Feb. 27, 2009

(65) Prior Publication Data

US 2010/0220969 A1 Sep. 2, 2010

(51) Int. Cl.
*G02B 6/00* (2006.01)
(52) U.S. Cl. .......................... 385/136; 385/147
(58) Field of Classification Search .......... 385/134–138, 385/147; 294/1.1; 254/134.3 R
See application file for complete search history.

(56) References Cited

U.S. PATENT DOCUMENTS

| | | | |
|---|---|---|---|
| 3,740,698 A * | 6/1973 | Jerominek | 439/61 |
| 5,115,260 A * | 5/1992 | Hayward et al. | 385/100 |
| 5,240,092 A * | 8/1993 | Eachus | 191/12 R |
| 5,598,494 A * | 1/1997 | Behrmann et al. | 385/59 |
| 5,617,501 A * | 4/1997 | Miller et al. | 385/134 |
| 6,266,469 B1 * | 7/2001 | Roth | 385/136 |
| 6,561,700 B1 * | 5/2003 | Koren | 385/58 |
| 7,025,509 B2 * | 4/2006 | Martin | 385/86 |
| 7,277,162 B2 * | 10/2007 | Williams | 356/32 |
| 7,369,716 B2 * | 5/2008 | Berg et al. | 385/12 |
| 7,672,562 B1 * | 3/2010 | Fandl et al. | 385/138 |
| 2001/0019654 A1* | 9/2001 | Waldron et al. | 385/134 |
| 2002/0150376 A1* | 10/2002 | Lutzen et al. | 385/139 |
| 2004/0202401 A1* | 10/2004 | Berg et al. | 385/12 |
| 2008/0289181 A1* | 11/2008 | Kozak et al. | 29/890.09 |
| 2008/0317415 A1* | 12/2008 | Hendrickson et al. | 385/77 |

* cited by examiner

*Primary Examiner* — Akm Ullah
(74) *Attorney, Agent, or Firm* — Koji Noguchi; Michael A. Morra, Esq.

(57) ABSTRACT

A strain relief for distributing strain along an outer surface of an optical fiber cable is disclosed. The strain relief is shaped to surround and tangentially grip the cable via friction between the outer surface of the cable and an inner surface of the strain relief. The strain relief also includes a pulling eye to protect the cable (and a connector) from pulling force (i.e. strain), water and dust. The strain relief is relatively small, low cost and easy to use.

15 Claims, 10 Drawing Sheets

| Configuration | Pulling force (lbs) |
|---|---|
| No tie-wrap assembly | 22-26 |
| Three tie-wrap assembly | 25-30 |
| Three tie-wrap assembly with removable tape | 40-50 |
| No tie-wrap assembly with heat shrink tube | 53 |

SPIRAL OR S-CURVE STRAIN RELIEF FOR PULLING A FIBER OPTIC CABLE

CROSS REFERENCE TO RELATED APPLICATIONS

This application is related to the U.S. patent application Ser. No. 12/394,676 (now U.S. Pat. No. 7,672,562), by Jeffrey Fandl and Hongbo Zhang, having the title "OPTICAL CABLE HAVING AN ENLARGED SECTION TO FACILITATE PULLING", which is being filed concurrently, and incorporated by reference herein.

TECHNICAL FIELD

The present invention relates to optical fiber cables, such as a cable with a connector, and more particularly to apparatuses used to install such optical fiber cables.

BACKGROUND OF THE INVENTION

When optical fiber cables are ready to be installed, installation tools are attached to the cables. When a cable is pulled during installation using current installation tools, substantial strain is applied to the cable. Such strain can result in permanent damage to a fiber(s) inside the cable, permanent damage to a cable connection, unacceptably high signal loss and/or expensive repairs and rework. Use of current installation tools can also result in extended installation time, increased cable pulling resistance or obstruction, improper handling of both cable and connector, added time and risk of cable damage when a pulling eye is disassembled, and/or unacceptable taper adhesive residue on a cable jacket.

Therefore, there is a need for different type of apparatuses, which can distribute the strain effectively and provide ease in the cable installation.

SUMMARY OF THE INVENTION

The present invention provides a strain relief, which distributes the strain effectively and provide ease in an optical fiber cable installation by attaching to the optical fiber cable. The strain relief is shaped to surround and tangentially grip the cable via friction between the outer surface of the cable and an inner surface of the strain relief.

A method of distributing strain along an optical fiber cable during the application of a tensile force to the cable including the step of attaching an inner surface of a strain relief to an outer surface of the cable, wherein the strain relief is adapted to produce tangential grip to the cable by producing sufficient friction between the outer surface of the cable and the inner surface of the strain relief based on a shape of the strain relief.

BRIEF DESCRIPTION OF THE DRAWINGS

Referring now to the drawings,

FIGS. 8-1 to 8-4 show four different embodiments of the present invention; and

DETAILED DESCRIPTION

Figure 1A:
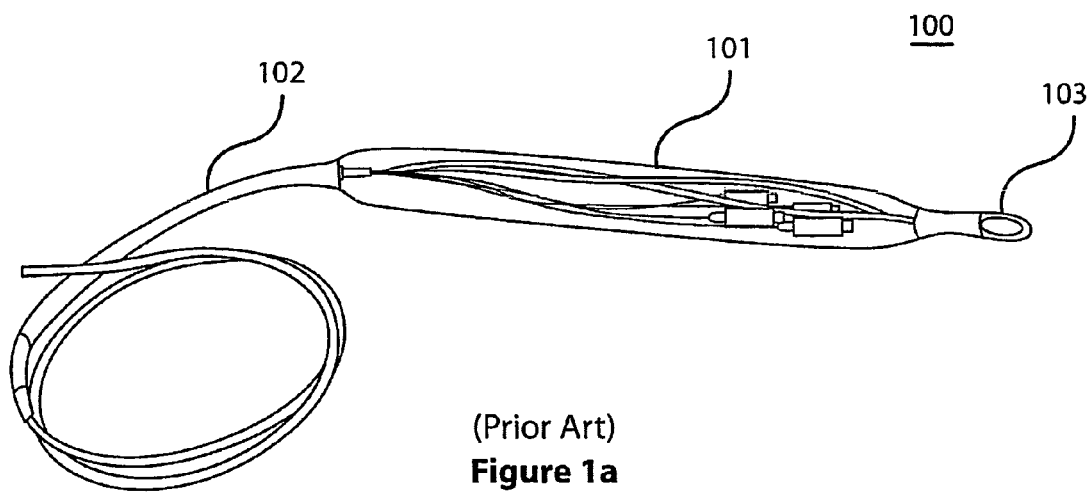
FIG. 1 shows three variations of current installation tools for optical fiber cable installation (FIG. 1a: a large scale webbed pulling eye with electrical or friction adhesive tape, FIG. 1b: a steel cable grip tool, FIG. 1c: "No-tape" type pulling grip)

In the following description, like reference numerals indicate like components to enhance the understanding of the invention through the description of the drawings. Also, although specific features, configurations and arrangements are discussed herein below, it should be understood that such is done for illustrative purposes only. A person skilled in the relevant art will recognize that other steps, configurations and arrangements are useful without departing from the spirit and scope of the invention.

During installation of an optical fiber cable, the cable is pulled through a facility ducting, a conduit or a riser at relatively high speed. When an optical fiber cable experiences such pulling, substantial strain is applied to the cable as well. Such strain can result in permanent damage to a fiber(s) inside the cable, permanent damage to a cable connection, unacceptably high signal loss and/or expensive repairs and rework.

Figures 1, 8:
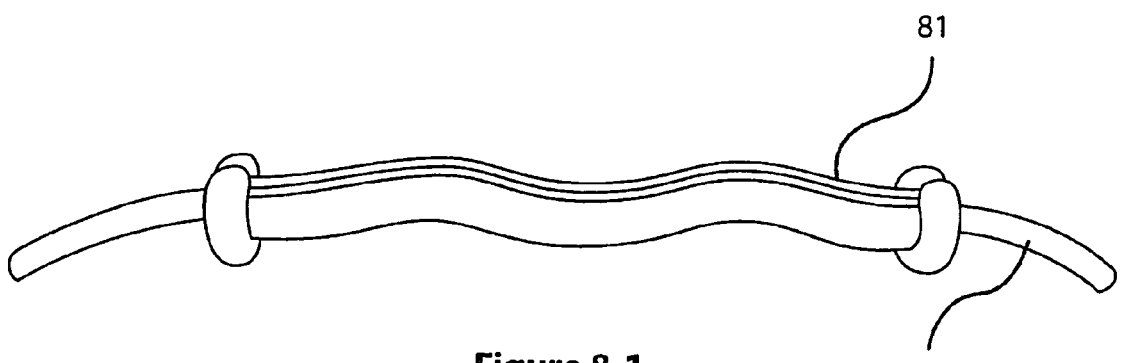
FIG. 8 shows experimental results of four different embodiments of the present invention.
Figures 2, 8:
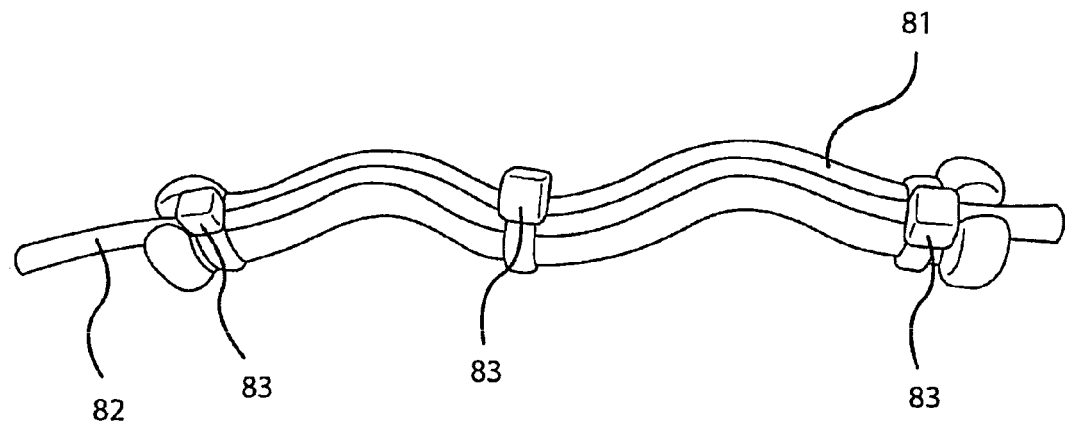
Figures 3, 8:
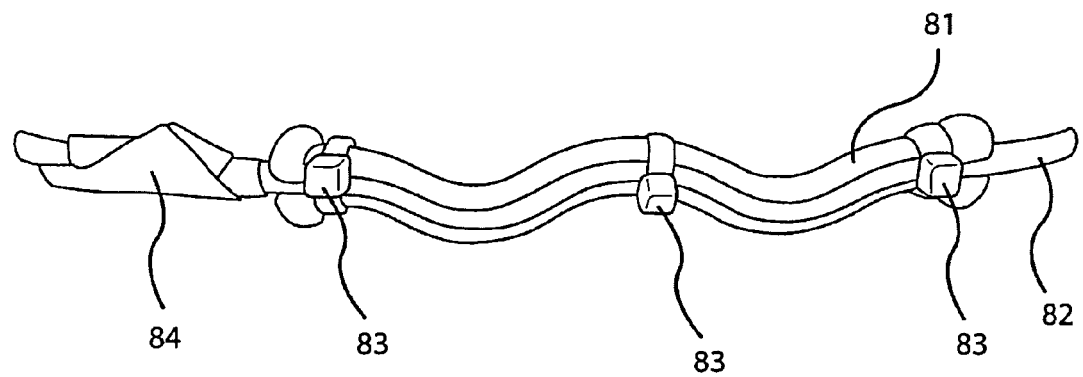
Figures 4, 8:
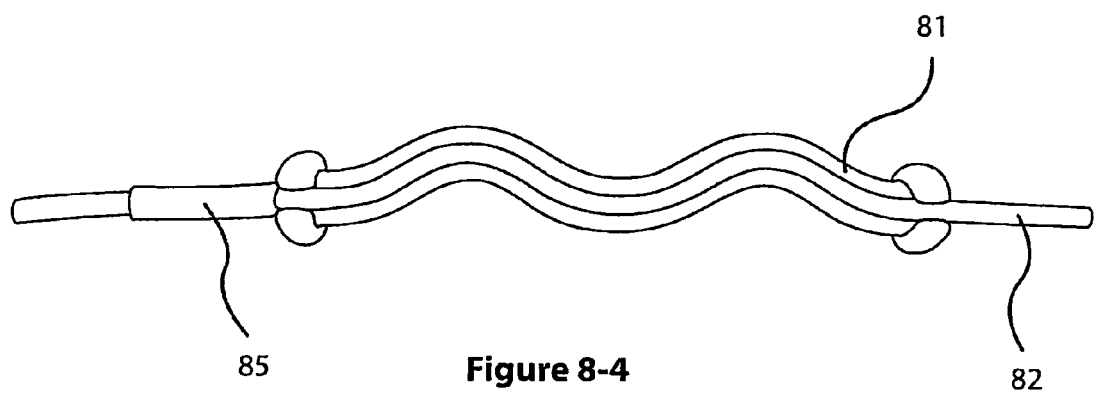

Referring now to FIG. 1, shown are three variations of current installation tools for optical fiber cable installation. FIG. 1a is a large scale webbed pulling eye 100 utilizing an adhesive tape. A dust cap 101 with a puling eye 103 covers a first end of an optical fiber cable. To attach the dust cap 101 to the cable, typically electrical or friction adhesive tape 102 are applied onto the cable. Since the dust cap 100 needs to be removed after the cable was pulled to desired location during the installation, the adhesive tape 102 have to be removable. Therefore, the area covered by the adhesive tape 101 tends to be larger to sustain pulling force because only relatively weak (removable) adhesive tapes can be used for this tool. The nature of the device lead to longer time to attach/detach the dust cap 101 and potential bending when the adhesive tape 102 is attached or removed by a technician.

Figure 1B:
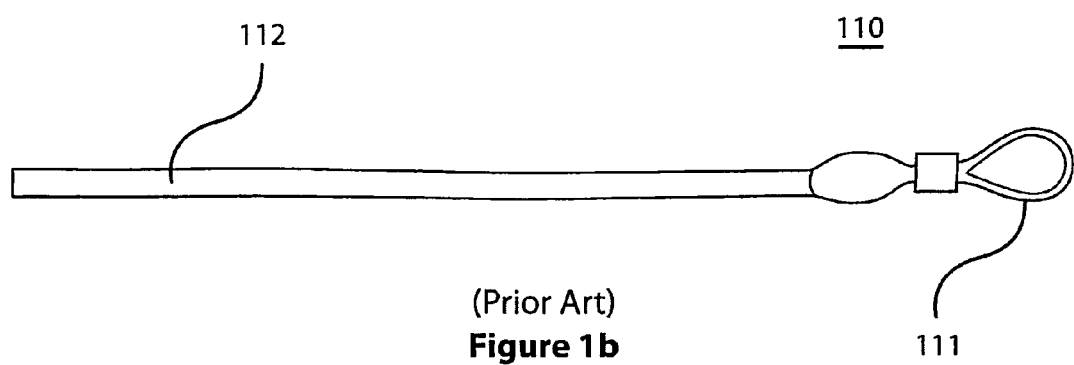

FIG. 1b is a steel cable grip tool. The steel cable grip tool 110 has a pulling eye 111 and a woven portion 112. When the woven portion 112 is pushed, it creates a space inside the woven portion 112 and when it is pulled, it reduces the inner space. To install an optical fiber cable using the tool, the cable is inserted into the inside of the woven portion 112 by pushing the woven portion 112 (i.e. creating a space inside the woven portion 112). Then, when the steel cable grip tool 110 is pulled, the woven portion 112 tightened up and holds the cable inside. However, this tool is not suitable for pulling a cable with a connector since the connector may be damaged by the woven portion 112 when the cable was pulled. Also, because constant pulling force is required to hold the cables inside of the woven portion, it is not suitable to use for installing optical fiber cables through congestion ducting.

Figure 1C:
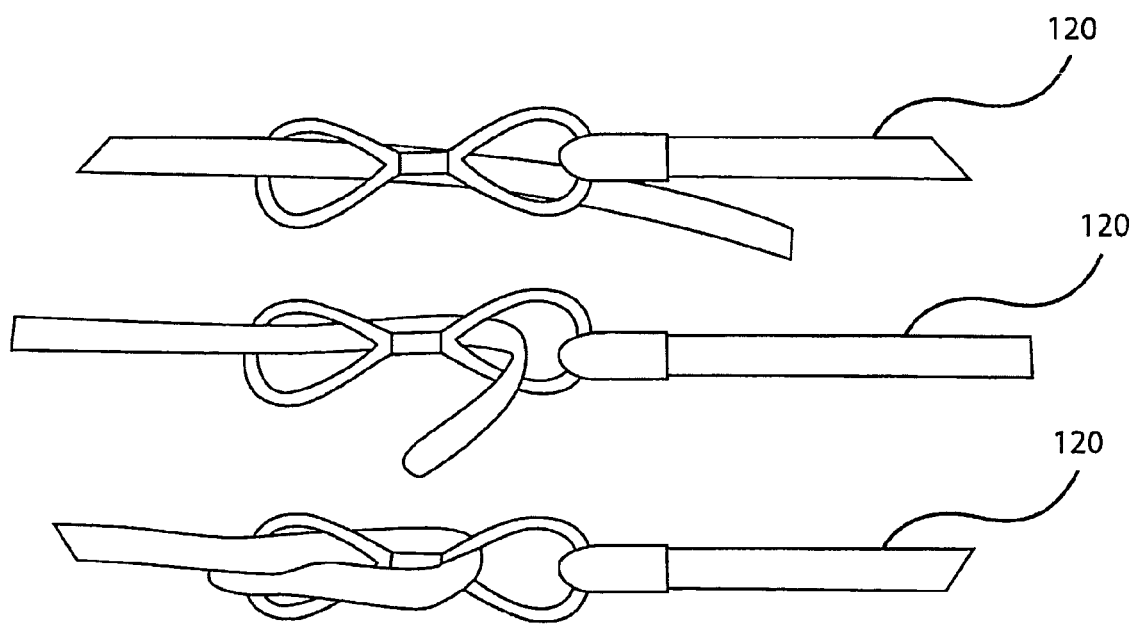

FIG. 1c is a "No-Tape"-type pulling grip. To install an optical fiber cable, the cable is wrapped around the pulling grip 120. However, wrapping a cable creates substantial bending to the optical fiber(s) inside the cable, and if a connector is attached to the cable, it is difficult to wrap the cable around the pulling grip 120.

Also, by using current installation tools, cable installation can be labor intensive to prepare for cable pulling. When cables are ready to install, usually a connector is attached to one end of the cable. To protect the connector from dust, strain, and water, often the connector (and a part of the cable) is covered by a device known as a dust cap. The dust cap usually has a pulling eye, which is configured to receive any suitable means for cable pulling. To attach the dust cap to the cable, the dust cap is typically taped or shrink wrapped to the cable. Therefore, a technician can pull the cable by pulling the pulling eye with appropriate mean. However, by using the current installation tools, this can result in extended installation time, increased cable pulling resistance or obstruction, improper handling of both cable and connector, added time and risk of cable damage when the pulling eye is disassembled, and/or unacceptable taper adhesive residue on a cable jacket.

For example, to prepare the large scale webbed pulling eye 100 in FIG. 1a, the dust cap 101 has to be attached to a cable with an adhesive tape 102. Since weak (removable) adhesive tape is used for the adhesive tape 102, a relatively large portion of the cable has to be covered by the adhesive tape 102 to prevent the dust cap 101 to be separated from the cable when the cable is pulled by the pulling eye 100. After the cable is pulled to the desired installation location, the adhesive tape 102 has to be removed carefully so as not to bend the cable and create bending loss. Since the adhesive tape covers relatively large portion of the cable, it is very labor intensive.

Accordingly, it would be desirable to have different type of apparatuses, which can distribute the strain effectively and provide ease in cable installation. One of the apparatuses disclosed in the present invention is a strain relief. The strain relief with a dust cap (with a pulling eye) protects a cable (and a connector) from pulling force (i.e. strain), water and dust. Also, the strain relief should be relatively small and low cost.

Strain relief devices according to the present invention are shaped to surround and tangentially grip an optical fiber cable via friction between an outer surface of the cable and an inner surface of the strain relief to distribute strain along the outer surface of the optical fiber cable. As embodiments, spiral and S-curve strain relief devices are described in detail.

Figure 2:
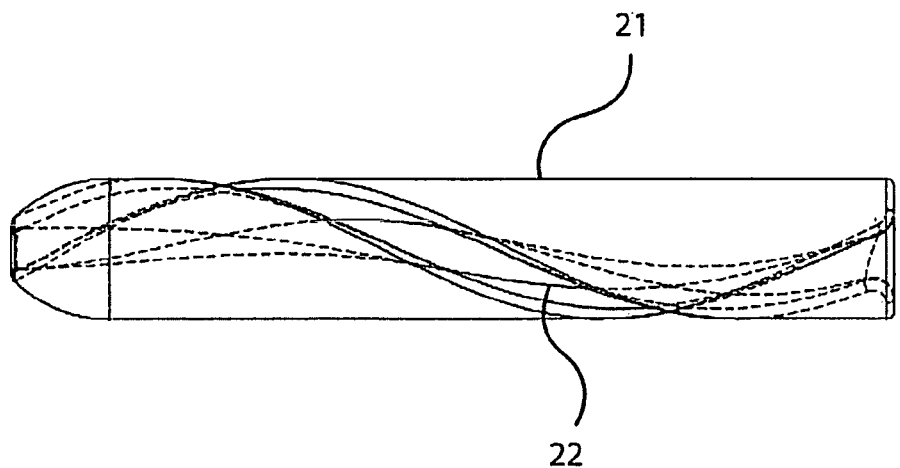
FIG. 2 is a simplified, perspective view of a spiral strain relief according to an embodiment of the invention.
Figure 3:
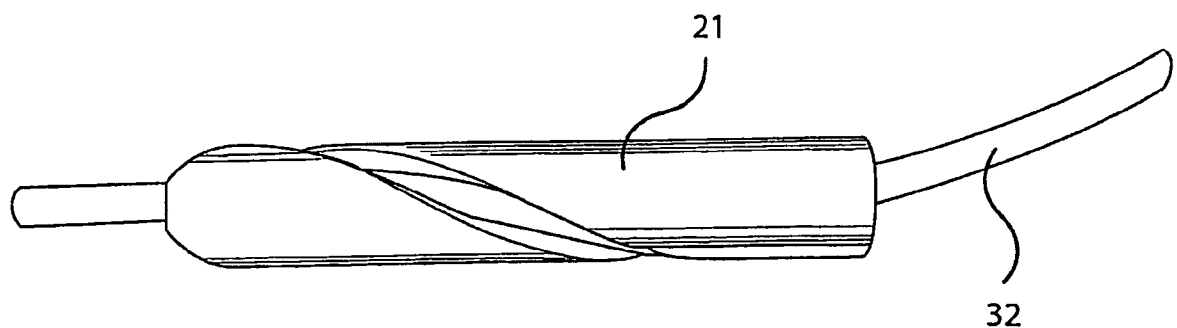
FIG. 3 shows the spiral strain relief with a cable.

Referring now to FIG. 2, a simplified, perspective view of a spiral strain relief according to an embodiment of the invention is shown. The spiral strain relief 21 has a spiral shape groove 22 from one end of the strain relief to the other end. The spiral is so spaced that it provides a sufficient contact surface between the spiral strain relief and the cable, and, at the same time, it does not creates a sharp bend in the cable. FIG. 3 shows the strain relief with a cable. In this example, a cable 32 is attached to strain relief 21. The spiral strain relief can be attached at the factory or on-site.

Figure 4:
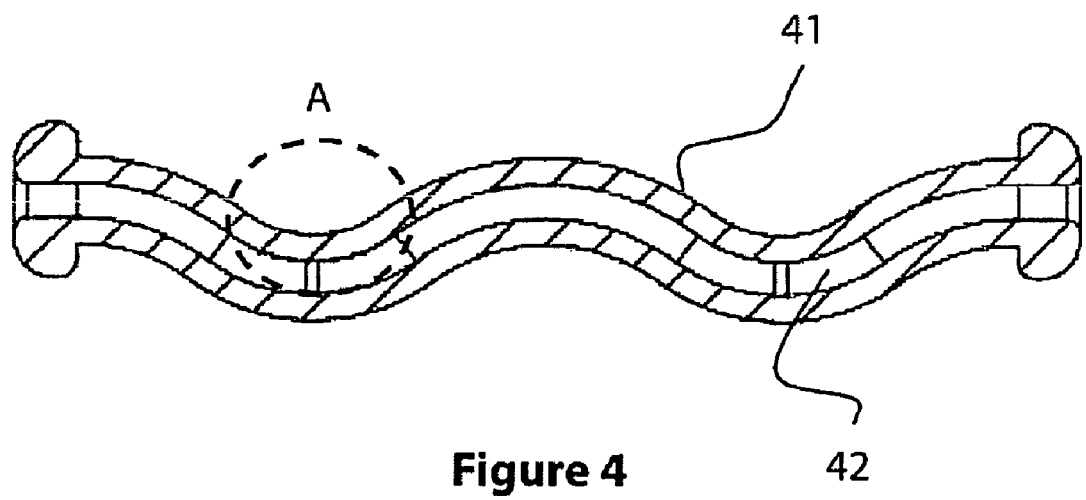
FIG. 4 shows a simplified, perspective view of an S-curve strain relief according to an embodiment of the invention.

Referring now to FIG. 4, a simplified, perspective view of an S-curve strain relief according to an embodiment of the invention is shown. The S-curve strain relief 41 has an S-curve shape groove 42 from one end of the strain relief to the other end. The S-curve is shaped to provide sufficient contact area with a cable without introducing sharp bends to the cable (i.e. create only gentle bend if any).

Figure 4A:
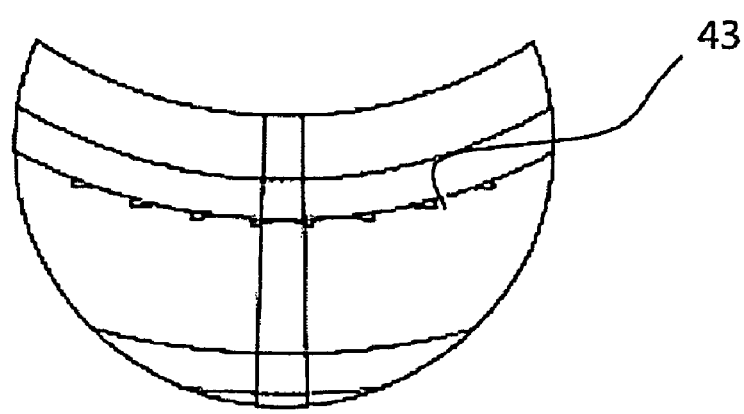
FIG. 4A shows blow up of section A in FIG. 4.

Preferably, at least a portion of the inner surface of a strain relief can comprise teeth. The teeth are created such that when a cable is attached to the strain relief, the teeth provide more grip to the cable, therefore increase frictional force between the strain relief and the cable. For example, a portion of the S-curve strain relief 41 can have teeth 43 as shown in the FIG. 4 (section A) and FIG. 4a. The teeth 43 can be placed all of the inner surface of the strain relief 41 or just a portion of it. Also, the shape of the teeth can be any suitable design. Factors, such as the area and the shape of the teeth within the inner surface of the strain relief, depend primarily on the frictional force required between the cable and the strain relief during the cable installation.

Figure 5:
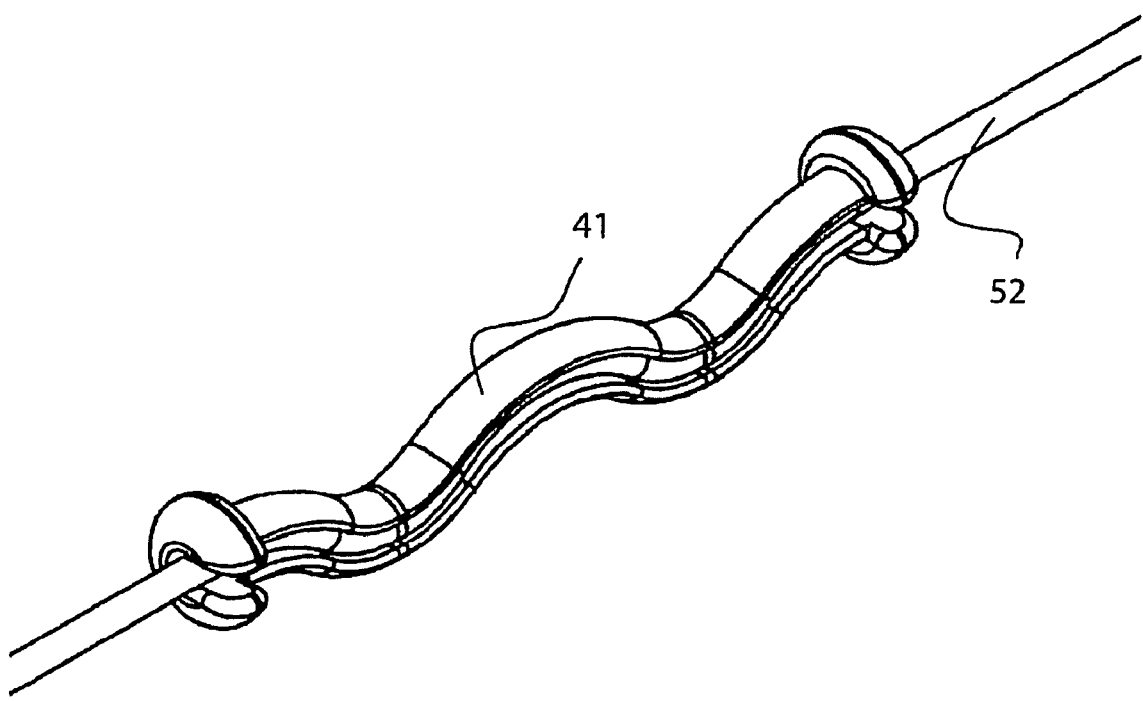
FIG. 5 shows the S-curve strain relief with a cable.

FIG. 5 shows strain relief 41 attached to a 3 mm single-fiber cable 52. The S-curve strain relief can be attached at the factory or on-site.

The strain relief of the present invention can be made from any material as long as it creates sufficient frictional force with the cable. In the embodiments of the present invention, the strain relief devices are made from plastic. More specifically, commodity type plastics such as rigid PVC or engineering resins such as Nylon (6, 11 or 12), PBT, and PET including 100% regrind resins can be used as a material for the strain relief.

The strain relief of the present invention can be of any size or shape as long as it has sufficient frictional force with the cable. The required frictional force depends on the size of the cable, a pulling speed, the outside jacket of the cable, and the material used for the strain relief. In the embodiments of the present invention, the strain relief is sized such that the cable with the strain relief can pass through a ¾ inch diameter conduit.

Figure 6:
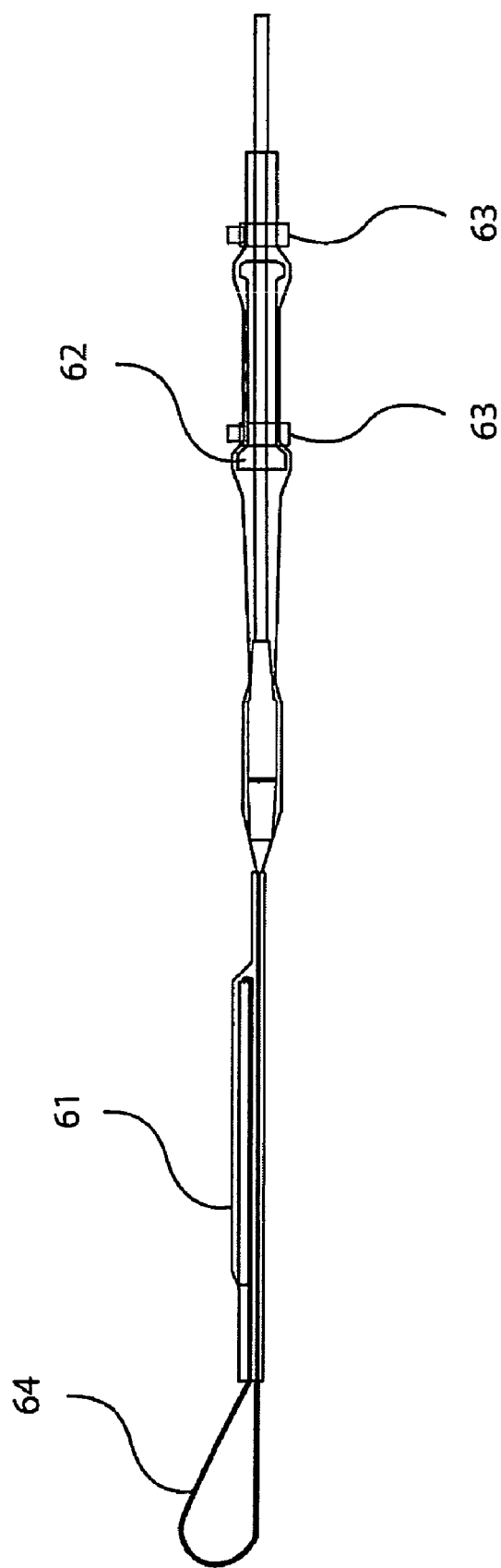
FIG. 6 shows one example of fastening the strain relief to the cable, and attaching a dust cap to the strain relief.

The strain relief of the present invention can be combined with a dust cap. FIG. 6 shows one example of fastening the strain relief to a cable, and attaching a dust cap to the strain relief. A dust cap 61 is a device, which makes a connection between a cable and a pulling device. The dust cap 61 usually accompanies a pulling eye 64, which is configured to connect to the pulling device (not shown in Figure). The dust cap 61 with the pulling eye 64 is common in connectors used for Multi Dwelling Unit (MDU) application as disclosed in U.S. patent application Ser. No. 12/144,259, filed Jun. 23, 2008, having the title "CONNECTOR-COVER FOR PULLING AND WATER RESISTANCE". As mentioned above, the dust cap 61 is typically taped or shrink wrapped to the cable, and this allows the technician to grip the cable for pulling. The dust cap 61 with the pulling eye 64 can be any material, having an "eye" in one end for connecting to any pulling device during cable installation. As an example, braided expandable mesh tubing material is used in embodiments of the present invention. The other end of the pulling eye is typically attached to a connector or the cable. However, in the embodiments of the present invention, as it is shown in FIG. 6, the dust cap 61 is attached to the strain relief 62 by fastening with two tie-wraps 63. By attaching the dust cap 61 to the strain relief 62 instead of directly to the cable, strain management improves significantly, and therefore, the cable can sustain a larger pulling force during cable installation. Alternatively, a wire or sheet metal strain relief retainer may be used for fastening. Also, it will be apparent to those skilled in the art that other methods of connecting the pulling eye with the strain relief can be employed without departing from the spirit and scope of the invention.

The cable attached to the strain relief can be any type of cable. The cable can be single-fiber or multi-fiber cables. The cable can be in various shape or size. The cable can also include one or more fiber ribbons, which have one or more optical fibers joined together with a buffer coating in a linear array.

The strain relief of the present invention can be attached to any type of cable easily. To attach the strain relief onto the cable, the cable only needs to be pushed into the groove of the strain relief. However, when the strain relief is attached to the cable, the cable should not be bent to cause permanent damage to the fiber in the cable. As mentioned above, if the cable is bent after it is attached to the strain relief, the strain relief is designed such that the bend created by the strain relief is much larger than the cable's bending diameter (i.e. a gentle curve).

Preferably, the strain relief is attached to the cable far enough from a connector (if any) to prevent any strain being applied to the connector, but close enough to the connector so that the connector does not become tangled with the dust cap and damage the connector and/or a fiber(s) inside the cable during the cable installation.

The present invention can be used to cables with any connectors, such as MPO, MTP, LC and SC connectors.

The contact area between the inner surface of the strain relief (e.g. spiral and S-curve) and the outer surface of the cable is large enough such that the contact area between the strain relief and the cable creates sufficient frictional force between them, so that the strain relief does not slip on the cable when the cable and/or the strain relief is pulled. To create a sufficient frictional force, the strain relief maybe tie-wrapped. Since the strain relief attaches to the cable more tightly by fastening, the tangential force between the cable and strain relief increases. By increasing the tangential force, the frictional force between them increases ($f_{max\ static} = \mu_{static} F_{normal}$, where $f_{max\ static}$ is the maximum static frictional force, $\mu_{static}$ is the static friction coefficient, and $F_{normal}$ is the normal (tangential) force), therefore, a smaller strain relief can be used to perform the same function. For example, a plastic retainer, a wire or sheet metal strain relief retainer may be used to fasten the strain relief.

Also, during the manufacturing process, an optical fiber cable sometimes has a large fluctuation from a designed diameter. Because of the manufacturing irregularity, strain reliefs designed for a specific cable type may not provide sufficient frictional force between the strain relief and the cable, or may not be able to attach to the cable at all. Fastening the strain relief onto the cable (by tie-wrapping for example) is helpful; however, depending on the material used for the strain relief, the degree of fastening can be limited and may not provide sufficient frictional force between the strain relief and the cable during the cable installation.

Figure 7:
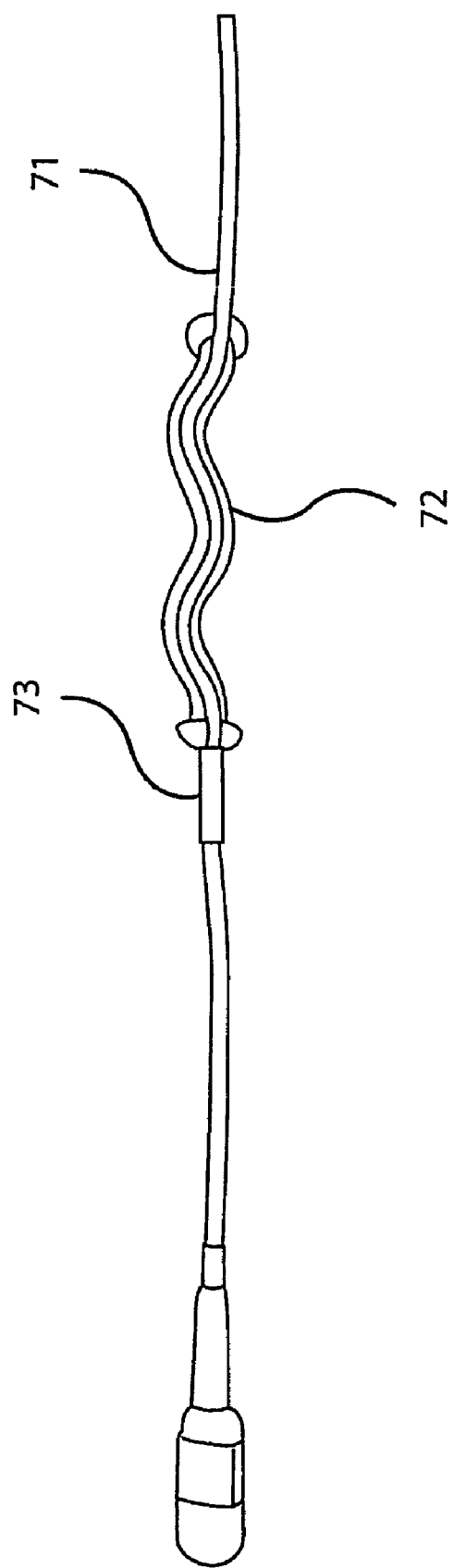
FIG. 7 shows the cable with both a stopper and the strain relief attached.

To overcome this issue, a stopper can be attached preceding and adjacent to the strain relief in the pulling direction. By attaching the stopper in the front of the strain relief along the pulling direction, even if the strain relief does not provide enough frictional force and therefore the strain relief starts to slip on the cable to the pulling direction, the stopper prevents the strain relief from further slipping toward the pulling direction. FIG. 7 shows one way to attach a stopper 73 next to the strain relief 72 on the cable 71.

FIG. 8 shows experimental results of four different configurations of the strain relief. In the experiment, a strain relief is attached to a 3 mm single-fiber cable and with four different configurations to measure pulling force of each configuration. To measure pulling force, a pulling eye is attached to the strain relief and pulling force is continued to be applied to the strain relief device until it starts to slip. The four configurations tested in the experiments are 1) no tie-wrap assembly: a S-curved strain relief 81 is attached to the cable 82 (FIG. 8-1); 2) three tie-wrap assembly: 3 tie-wraps 83 is attached to 1) assembly (FIG. 8-2); 3) three tie-wrap assembly with a removable tape 84: a removable tape is added to 2) assembly as a stopper (FIG. 8-3); and 4) no tie-wrap assembly with heat shrink tube: a heat shrink tube 85 is added to 1) assembly as a stopper (FIG. 8-4). As shown in the experimental results in FIG. 8, the configurations 3) and 4), which use the stoppers can sustain from significantly more pulling force compare, to the configuration 1 (i.e. approximately double the pulling force compare to the configuration 1).

The combination of the strain relief and the stopper sustain from relatively large pulling force compared to the strain relief alone, however, the stopper can be used independently. The stopper can be tightly attached to the outer surface of the jacket of the cable and configured to stop an installation tool from sliding over the stopper when the cable is being pulled by the installation tool. As the installation tools, for example, a strain relief and/or a dust cap with a pulling eye can be used.

The stopper tightly attaches to the outer surface of the jacket with sufficient frictional force that it remains immobile relative to the cable when the installation tool pushes the stopper during the cable installation. The stopper needs to sustain from the pulling force during the cable installation, however; it can be kept onto the cable or removed after the cable installation.

Figure 9:
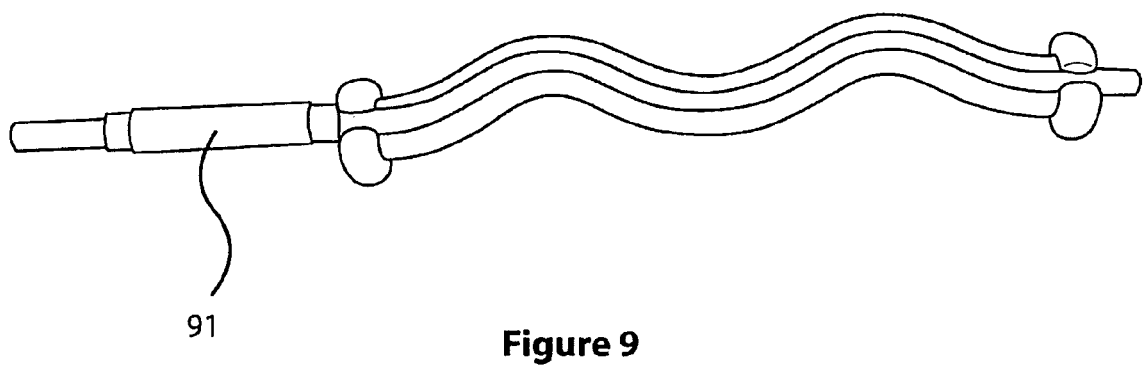
FIG. 9 shows a stopper with serial ID printed on the outer surface of the stopper.

Any suitable material can be used for the stopper as long as they sustain from the pulling force during the cable installation. For example, a tape or a heat-shrink tube can be used as a stopper. After the cable installation, the stopper can be removed. However, suitable material has to be selected such that when the stopper is removed, it does not damage the cable and optical fiber(s) inside the cable, such as by bending. Preferably, the stopper stays on the cable after the cable installation. A stopper with relatively strong adhesive is used so that the area where the stopper covers on the cable can be shortened. Optionally, the outer surface of the stopper can be printed with one or more letters. For example, as shown in FIG. 9, the outer surface of the stopper 91 can be printed with serial ID.

The thickness of the stopper is such that it stops the installation tool used during cable installation from sliding over the stopper. Preferably, the thickness of the stopper is at least 0.005 inches. Also, the cross section of the stopper can be any shape or form as long as the stopper stops the installation tool. Preferably, the cross-sectional shape of the stopper is the same shape as the jacket of the cable such that the pulling force during the cable installation distribute evenly onto the cross section of the stopper.

The cable attaching the stopper can be any type of cable. The cable can be include one or more optical fibers. The cable can be in various shape or size. The cable can also include fiber ribbons, which have one or more optical fibers and each of the optical fibers is jointed together with a buffer coating in a linear array.

Often when cables are ready to be installed, a connector is placed on one end of the optical fiber cable at the factory. When a connector is attached to a cable to be installed, the stopper is placed relative to the connector such that the optical fiber in the cable those not experience significant bending during the cable installation.

The stopper can be attached to the cable in various ways. However, if a connector is going to be attached on the cable, then the material used as a stopper may need to be attached to the cable in advance. For example, if a heat-shrink tube is used as a stopper, it needs to be attached to the cable before the connector is attached.

It will be apparent to those skilled in the art that many changes and substitutions can be made to the embodiments of the invention herein described without departing from the spirit and scope of the invention as defined by the appended claims and their full scope of equivalents.

What is claimed is:

1. An apparatus for distributing strain along an outer surface of an optical fiber cable comprising:
    a single-piece strain relief having an elongated slot along its entire length for receiving the cable and being shaped to surround and tangentially grip the cable via friction between the outer surface of the cable and an inner surface of the strain relief, wherein the shape of the strain relief is an S-curve, and wherein the strain relief attaches to a pulling eye and via a dust cap.

2. The apparatus of claim 1, wherein the strain relief is made of plastic.

3. The apparatus of claim 1, wherein the strain relief is so sized such that the cable with the strain relief can pass through a ¾ inch diameter conduit.

4. The apparatus of claim 1, wherein the optical fiber cable is a single fiber cable or a multi-fiber cable.

5. The apparatus of claim 1, wherein frictional contact area between the inner surface of the strain relief and the outer surface of the cable is large enough such that the strain relief does not slip with respect to the cable when the cable or the strain relief is pulled.

6. The apparatus of claim 1, wherein at least a portion of the inner surface of the strain relief include teeth.

7. The apparatus of claim 1, wherein the strain relief further comprises a stopper to prevent the strain relief to slip along the cable when the strain relief is pulled.

8. The apparatus of claim 1, wherein the optical fiber further includes with a connector.

9. A method of distributing strain along an optical fiber cable during the application of a tensile force to the cable, comprising the step of:

attaching the inner surface of a the strain relief of claim 1 to an outer surface of the cable along the entire length of the strain relief, wherein the strain relief is adapted to produce tangential grip to the cable by producing sufficient friction between the outer surface of the cable and the inner surface of the strain relief based on the shape of the strain relief, and the shape of the strain relief is an S-curve.

10. The method of claim 9, wherein a contact surface between the inner surface of the strain relief and the outer surface of the optical fiber cable is secured by fastening the strain relief to the optical fiber cable.

11. The method of claim 10, wherein the strain relief is fastened to the cable by tie wrap.

12. The method of claim 9 further comprising the step of attaching a stopper to the cable so that the strain relief does not slip against the cable when the strain relief is pulled.

13. The method of claim 9, wherein the strain relief is attached to the optical fiber cable such that no strain is applied to a connector attached to the cable.

14. The apparatus of claim 1, wherein substantially all of the strain from a pulling device is transmitted to the strain relief, and the strain relief distributes the strain to the cable via frictional contact between the inner surface of the strain relief and the outer surface of the cable.

15. The apparatus of claim 1, wherein the dust cap is attached to the strain relief via a tie wrap.

* * * * *